(No Model.)
J. RICHARDSON.
PROPELLER SHAFT BEARING.
No. 378,975. Patented Mar. 6, 1888.
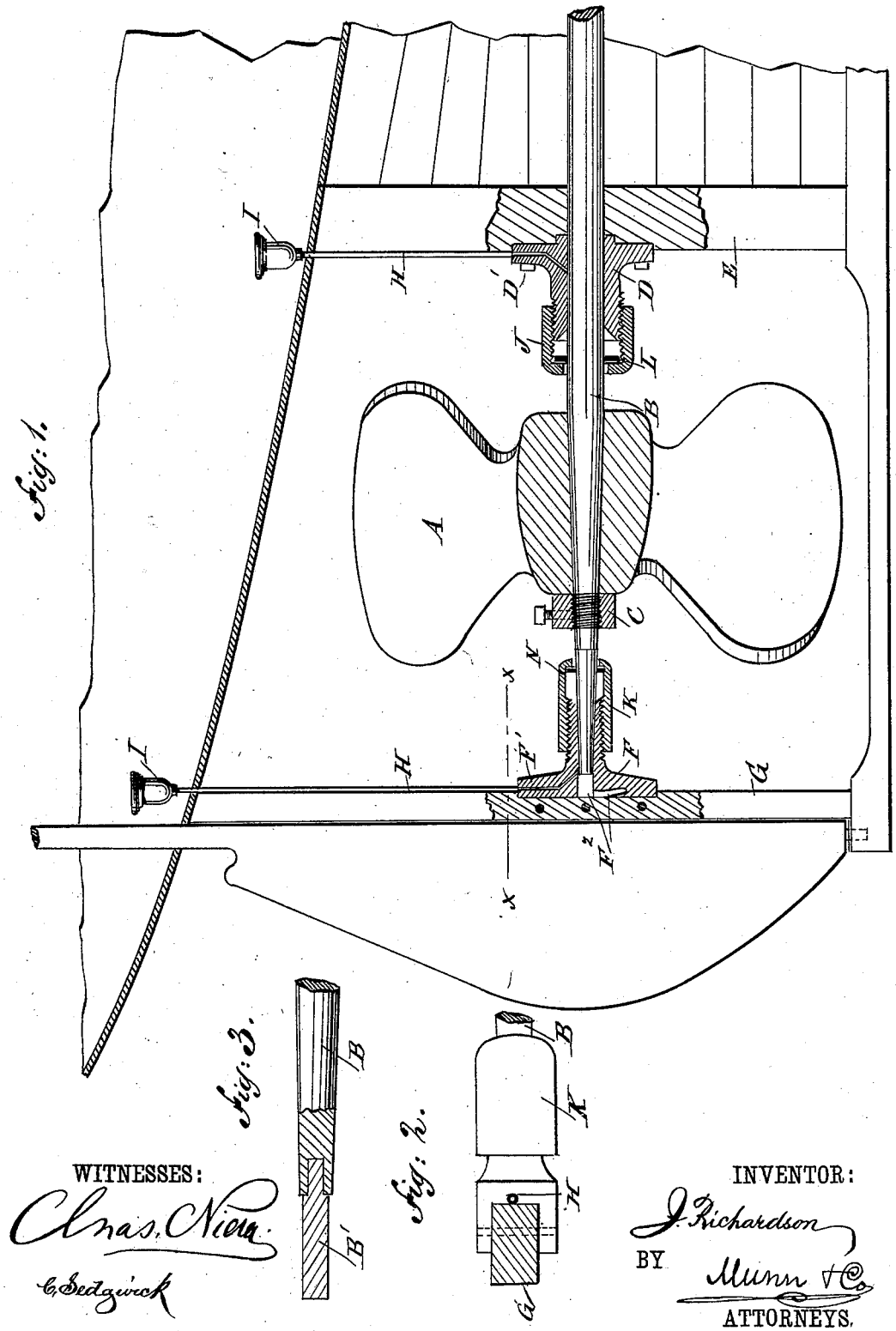
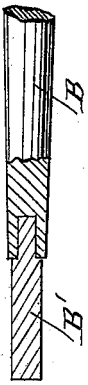
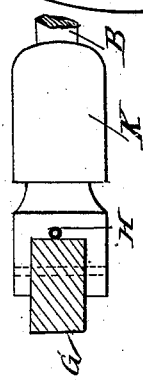
WITNESSES:
INVENTOR:
J. Richardson
BY Munn & Co.
ATTORNEYS.

United States Patent Office.

JOHN RICHARDSON, OF ST. MARY'S, GEORGIA.

PROPELLER-SHAFT BEARING.

SPECIFICATION forming part of Letters Patent No. 378,975, dated March 6, 1888.

Application filed July 8, 1887. Serial No. 243,768. (No model.)

*To all whom it may concern:*

Be it known that I, JOHN RICHARDSON, of St. Mary's, in the county of Camden and State of Georgia, have invented a new and Improved Propeller-Shaft Bearing and Means for Lubricating the Same, of which the following is a full, clear, and exact description.

The object of my invention is to provide a new and improved propeller-shaft bearing to prevent the rapid wearing out and at the same time making the bearings oil in the place of water bearings.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional side elevation of my improvement. Fig. 2 is a sectional plan view of the same on the line $xx$ of Fig. 1; and Fig. 3 is a view of a modified form of the end of the propeller-shaft.

Heretofore propeller-shafts have terminated at the rear end of the hub of the propeller-screw, thus leaving the rear end of the shaft without a bearing, so that all strain of the forward and sidewise pressure of the propeller-screw was thrown upon the bearing in front of the propeller-screw, so that this bearing was rapidly worn out, thereby causing leakage and loss of power applied to the shaft for turning the same. With my improvement, presently to be described, I obviate these difficulties and produce propeller-bearings in which the lateral motion of the shaft and wearing out of the shaft are prevented.

The propeller-screw A, of any approved construction, is secured in the usual manner to the propeller-shaft B, and is held in place by the jam-nut C. The propeller-shaft B is held in front of the screw A in a bearing, D, secured in the usual manner to the stern-post E of the vessel. The shaft B is lengthened beyond the rear end of the screw A, and this lengthened end passes into the bearing F, secured to the rudder-post G. The bearings D and F are provided with oil-holes D' and F', respectively, into which lead the upwardly-extending pipes H, passing through the bottom of the vessel, and each carrying on its upper end an oil-cup, I, of any approved construction, so that oil placed in said cups I passes down the pipes H into the oil-holes D' and F', respectively, thus oiling the shaft B in the bearings D and F.

On the bearings D and F screw the caps J and K, respectively, serving to press a packing of any suitable material against the ends of the bearings D and F. On the inside of each cap J and K is held, on the shaft B, a ring, L or N, which covers the opening in the cap J or K, through which opening the shaft B passes, thereby preventing sand or other impurities contained in the water from passing into the bearings D and F. In the bearing F is formed a downwardly-extending groove, $F^2$, which connects at its upper end with the aperture of the shaft-bearing, so that the waste oil in the bearing F accumulates and is held in the said groove $F^2$.

In case the propeller-shaft B terminates at the rear end of the hub of the screw A, I lengthen the said shaft by adding the part B' to the rear end of the shaft, as shown in Fig. 3, and this rear part, B', passes into the bearing F.

It will be seen that sand and other impurities cannot pass into the bearings F and D on account of the caps J and K, respectively, and the rings L and N, and the sidewise and lateral strain of the propeller-screw A is equally taken up by the two bearings D and F. The latter can be conveniently oiled from the inside of the vessel by filling the oil-cups I.

Having thus described my invention, what I claim as new, and desire to secure by Letters Patent, is—

1. The combination, with a propeller-shaft lengthened beyond the rear end of the hub of the propeller screw, of a bearing secured to the stern-post of the vessel and a bearing secured to the rudder-post of the vessel, each of said bearings being provided with oil-holes, pipes connected with said oil-holes and extending upward through the bottom of the vessel, and oil-cups secured to the upper ends of said pipes, substantially as shown and described.

2. The bearing F, provided with the oil-passage F' and downwardly-extending groove $F^2$, in combination with the cap K and ring N, substantially as herein shown and described.

JOHN RICHARDSON.

Witnesses:
JOHN J. RUDULPH.
E. A. MCWHORTER.